United States Patent
Kuwabara (10) Patent No.: US 7,526,602 B2
(45) Date of Patent: Apr. 28, 2009

(54) MEMORY CONTROL SYSTEM AND MEMORY CONTROL CIRCUIT

(75) Inventor: Keiichi Kuwabara, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 239 days.

(21) Appl. No.: 11/508,291

(22) Filed: Aug. 23, 2006

(65) Prior Publication Data

US 2007/0047362 A1 Mar. 1, 2007

(30) Foreign Application Priority Data

Aug. 26, 2005 (JP) ............... 2005-246188
Aug. 17, 2006 (JP) ............... 2006-222213

(51) Int. Cl.
*G06F 12/00* (2006.01)

(52) U.S. Cl. ....................................... 711/106

(58) Field of Classification Search ........................ None
See application file for complete search history.

(56) References Cited

U.S. PATENT DOCUMENTS 7,366,828 B2 * 4/2008 Sakurai ...................... 711/106

FOREIGN PATENT DOCUMENTS

| JP | 11-7763 | 1/1999 |
| JP | 2003-91453 | 3/2003 |
| JP | 2005-267369 | 9/2005 |

* cited by examiner

*Primary Examiner*—Hiep T Nguyen
(74) *Attorney, Agent, or Firm*—Young & Thompson (57) ABSTRACT

A memory control system includes a first memory for accessing a CPU via an address bus and a data bus, an SDRAM for accessing a CPU via the address bus and the data bus, a SDRAM control circuit for outputting a refresh request to the DRAM and a selection unit for selecting a signal line of the address bus and outputting a signal of the signal line corresponding to the refresh request of the SDRAM control circuit to the SDRAM.

10 Claims, 10 Drawing Sheets

RELATED ART

MEMORY CONTROL SYSTEM AND MEMORY CONTROL CIRCUIT

BACKGROUND OF THE INVENTION

1. Field of the Invention

The present invention relates to a memory control system and a memory control circuit, and particularly to a memory control circuit having a plurality of external memories.

2. Description of Related Art

A system equipped with external memories such as SDRAM (Synchronous Dynamic Random Access Memory) and flash memory or SDRAM and SRAM (Static Random Access Memory) is known. Generally in such a system, a memory bus is shared among the external memories.

In DRAM devices, a SDRAM device is different from an EDO (Extended Data Out) DRAM device. In a SDRAM device, various commands can be input by combining control signals such as /RAS (Row Address Strobe) signal, /CAS (Column Address Strobe) signal and /WE (Write Enable) signal and so on.

One SDRAM device normally has a plurality of banks. Each bank is independently accessible in a SDRAM device. In such a SDRAM device, when a refresh operation is performed, all banks have to be precharged and the SDRAM device has to be in an idle state.

Figure 6:
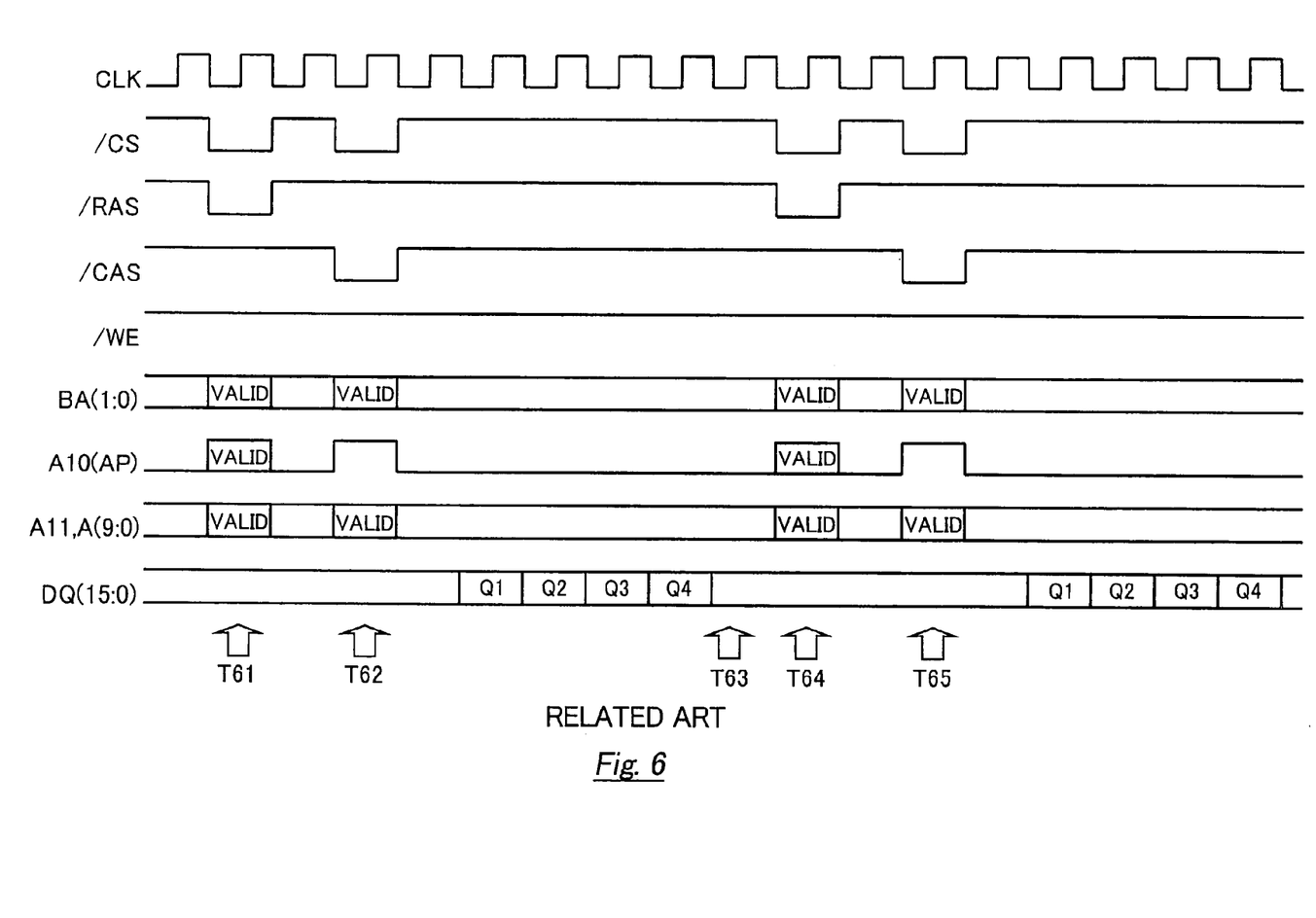
FIG. 6 is a timing chart explaining an operation of a SDRAM.
Figure 7:
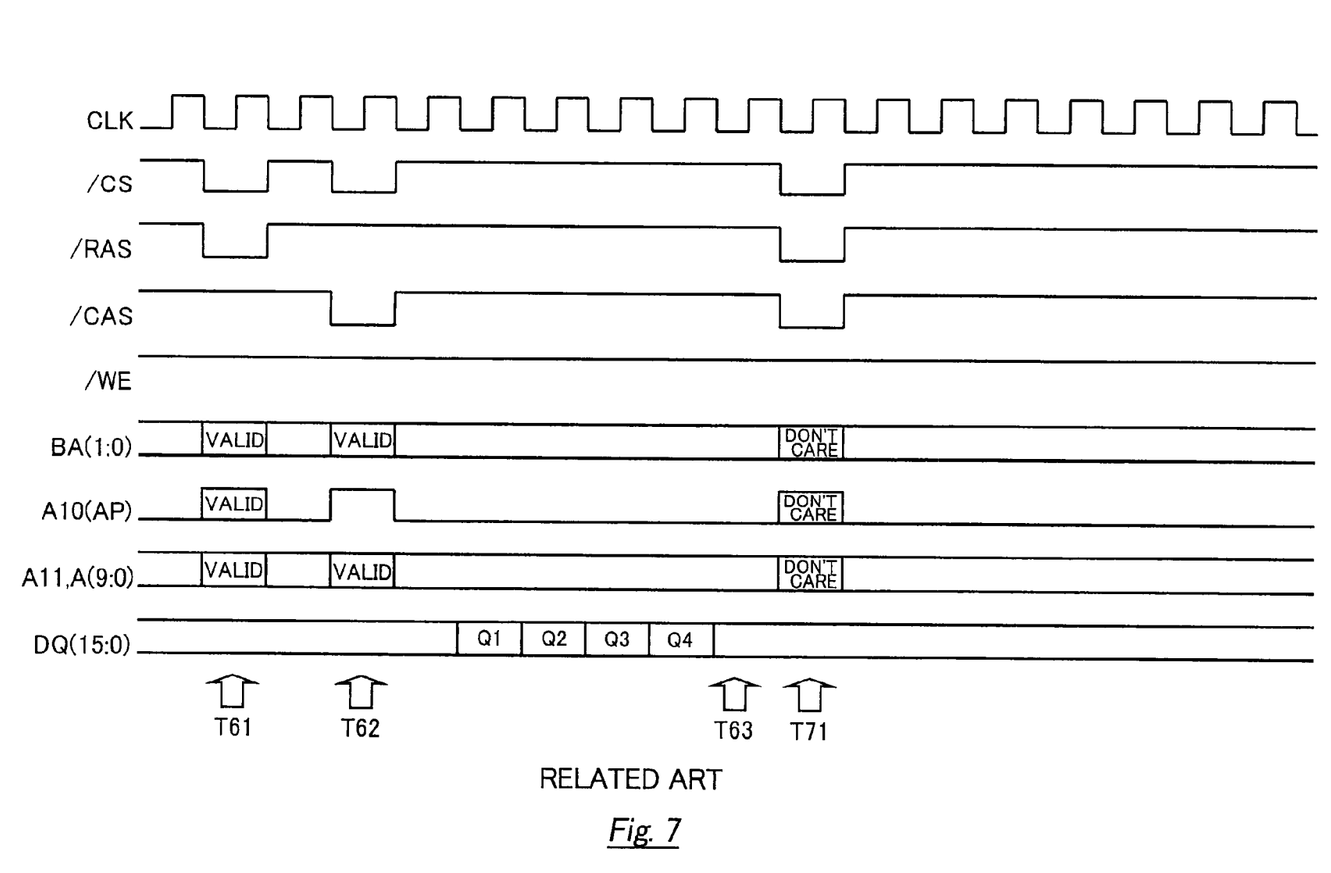
FIG. 7 is a timing chart explaining an operation of a SDRAM.

In order to perform the refresh operation smoothly, there are commands which are called "read (or write) command with auto precharge" so as to access SDRAM. Timing charts for such access are shown in FIGS. 6 and 7. For a read (or write) command with auto precharge, after retrieving a bank address (BA) and row address (A0 to A11) at a timing T61 in FIG. 6, a command indicating read with auto precharge (/CS, /RAS, /CAS, /WE, and A10) and a column address (A0 to A9, and A11) are retrieved at a timing T62 in FIG. 6. Then after a read operation to read data (write operation for writing data. See DG in FIG. 6), the accessed bank is precharged at a timing T63 in FIG. 6. Precharging accessed banks makes SDRAM to be an idle state. A read (or write) access with auto precharge makes the SDRAM to be always in an idle state. For example, when a read access by "read command with auto precharge" is performed, an accessed bank is precharged after each access, and the SDRAM device becomes an idle state. In case that a read access with auto precharge is performed, a SDRAM device is in an idle state after every access. Therefore, the refresh operation can be performed immediately when a refresh operation is requested.

Figure 8:
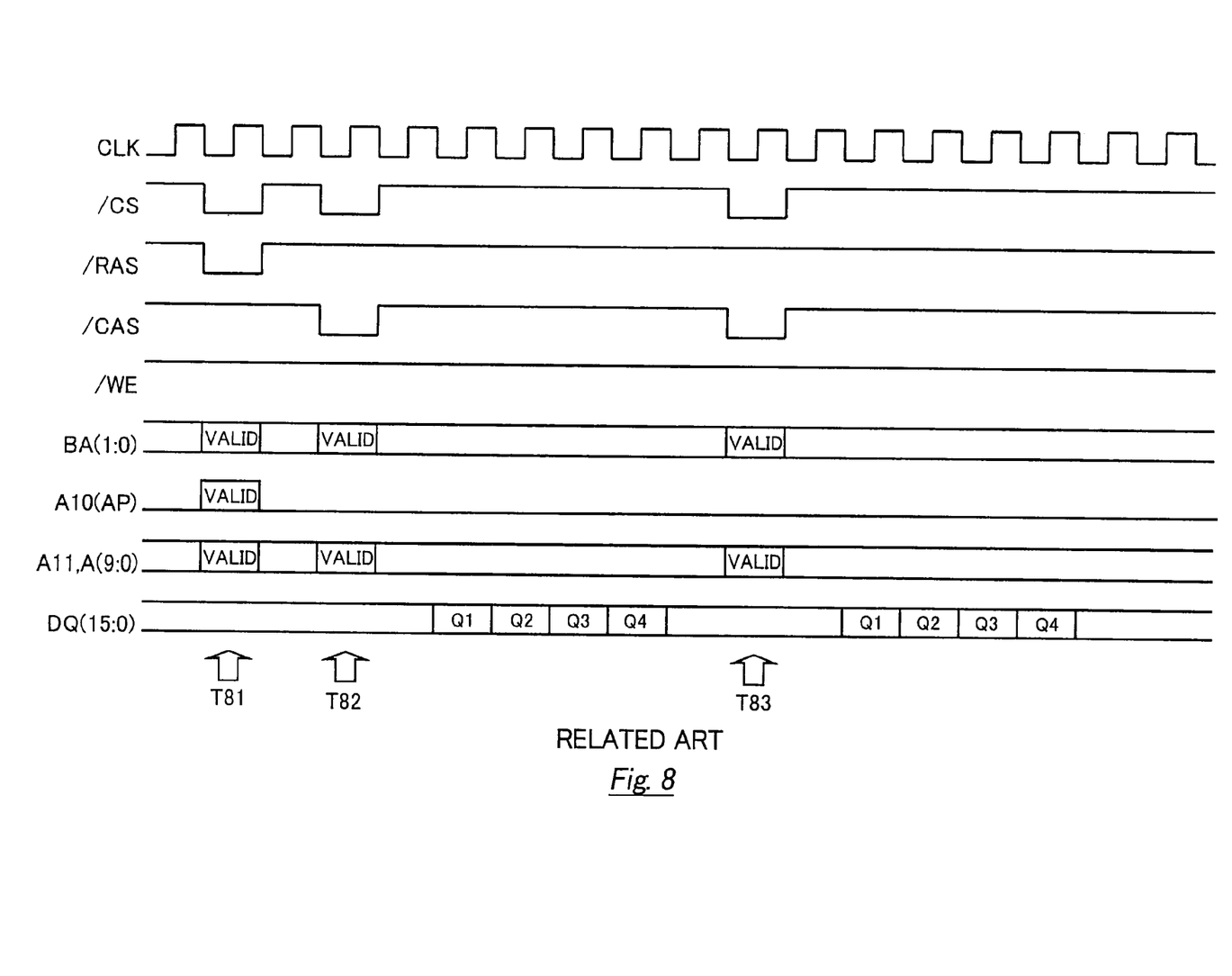
FIG. 8 is a timing chart explaining an operation of a SDRAM.
Figure 9:
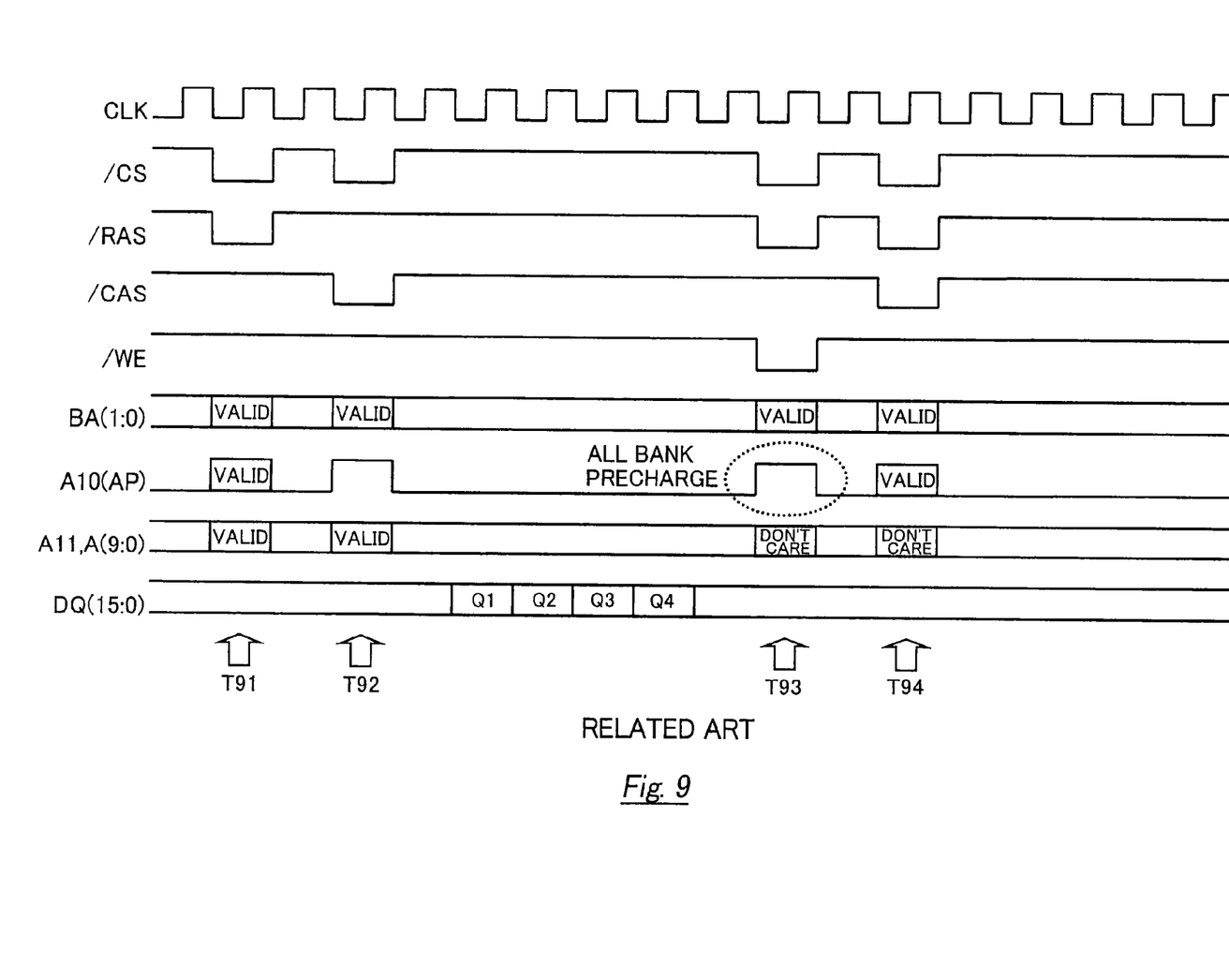
FIG. 9 is a timing chart explaining an operation of a SDRAM.

However, a read (or write) access with auto precharge has a precharge operation and a bank activation operation in every access (see timings T63 and 64 in FIG. 6). These operations (precharge operation and bank activation operation) delay access speed of the SDRAM device. Therefore, there are commands called "read (or write) command without auto precharge". According to read (or write) accesses without auto precharge, access speed of the SDRAM device can be improved. FIGS. 8 and 9 show timing chart for accessing without auto precharge.

In a read access without auto precharge, an accessed bank is not precharged after every access. If the next read (write) access is the read (write) access to the same bank which is accessed in the last read (write) access, the next read (write) access is performed without bank activation. If the next read (write) access is not the read (write) access to the same bank which is accessed in the last read (write) access, the bank corresponding to the next read access is activated, and the next read access is performed. In this case, even if the next read (write) access is not the read (write) access to the same bank which is accessed in the last read (write) access, the bank accessed in the last read (write) access is not precharged (see T83 in FIG. 8).

When a refresh operation is requested to the SDRAM device which is accessing without auto precharge, all banks have to be precharged because the SDRAM devise is not in an idle state due to accesses without auto precharge (see T93 in FIG. 9). The precharge of all banks can be performed according to one of the commands. In order to perform the precharge of all banks, the command is input via not only control terminals, such as /RAS terminal and /CAS terminal, but also address terminals (A10).

Figure 10A:
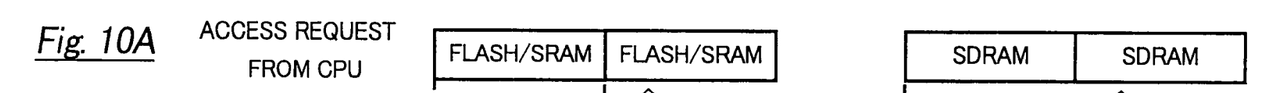
FIGS. 10A to 10C are views showing operations of a conventional memory control system.
Figure 10B:
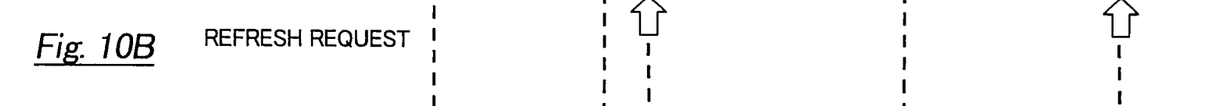
Figure 10C:
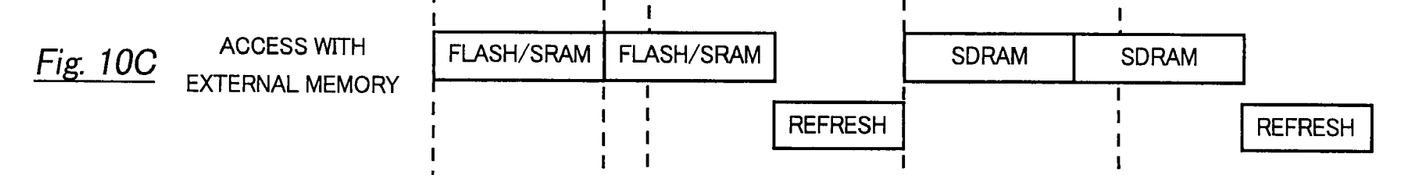

In a system equipped with external memories, a device accessing external memories includes a memory control circuit. The memory control circuit controls accesses to the external memories. In this kind of a system, an access request from a system LSI including CPU to SRAM or flash memory, an access request to SDRAM, and a refresh request to SDRAM are generated. The refresh request to SDRAM is generated at a constant interval regardless of an access request from CPU to a memory storage. As described above, the refresh request includes a signal which is input to a certain address terminal via address bus because the refresh request includes the command for precharging all banks. Therefore, if an access request to SRAM conflicts with the refresh request to SDRAM, an access to the SRAM is completed first, then the SDRAM is refreshed (see FIG. 10). Further, during a refresh period of the SDRAM, an access request to other external memory is suspended.

However it has been discovered that with the method which refreshes SDRAM after completing an access to SRAM, an address bus and a data bus (hereinafter referred to as a bus) cannot be utilized during the refresh period, because SRAM (or flash memory) and SDRAM share the bus. Accordingly it lowers efficiency in use of the bus and a transfer efficiency of a system.

A related art are disclosed in Japanese Unexamined Patent Application Publication No. 11-7763. In Japanese Unexamined Patent Application Publication No. 11-7763, a refresh operation is performed during an access is performed with a device except for a DRAM. However, Japanese Unexamined Patent Application Publication No. 11-7763 only discloses a conventional DRAM technology, and a refresh operation of a SDRAM is not disclosed.

SUMMARY OF THE INVENTION

According to an aspect of the present invention, there is provided a memory control system that includes a first memory for accessing a CPU via an address bus and a data bus, an SDRAM for accessing a CPU via the address bus and the data bus, a SDRAM control circuit for outputting a refresh request to the DRAM and a selection unit for selecting a, signal line of the address bus and outputting a signal of the signal line corresponding to the refresh request of the SDRAM control circuit to the SDRAM.

According to another aspect of the present invention, there is provided a memory control circuit for accessing a first memory and a SDRAM via a bus shared by the first memory and the SDRAM that includes a memory control circuit for generating a control signal for the first memory, a SDRAM control circuit for generating a control signal for the SDRAM and a selection unit for selection unit for selecting a signal line of the bus and outputting a signal of the selected signal line corresponding to a refresh request outputted by the SDRAM control circuit to the SDRAM.

According to another aspect of the present invention, there is provided a memory control system that includes a first memory control circuit for controlling a first memory, a SDRAM control circuit for controlling a SDRAM, a selection unit for selecting a signal line of an address signal outputted by the SDRAM control circuit corresponding to a refresh request to the SDRAM and connecting to the SDRAM, and an address bus for connecting the first memory with the first memory control circuit and connecting the SDRAM with the SDRAM control circuit.

According to another aspect of the present invention, there is provided a memory control system that includes a first memory connected to an integrated circuit via a common address bus, a SDRAM connected to the integrated circuit via the common address bus, a second address bus different from the common address bus, and an integrated circuit having a CPU for outputting a command signal corresponding to a refresh request to the SDRAM via the second address bus.

The present invention enables to improve efficiency in use of a bus.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
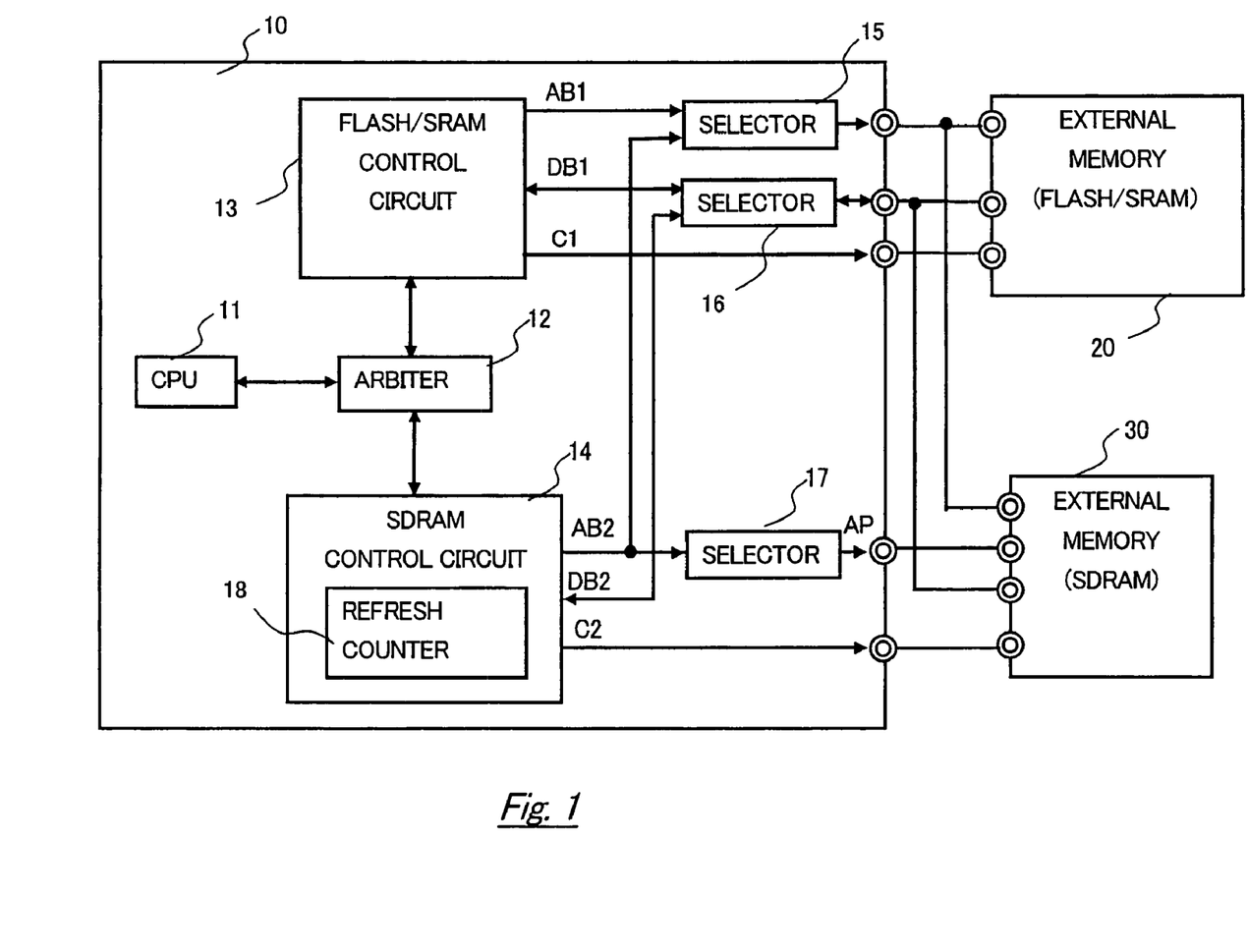
FIG. 1 is a view showing a configuration of a memory control system according to an embodiment of the present invention.
Figure 2:
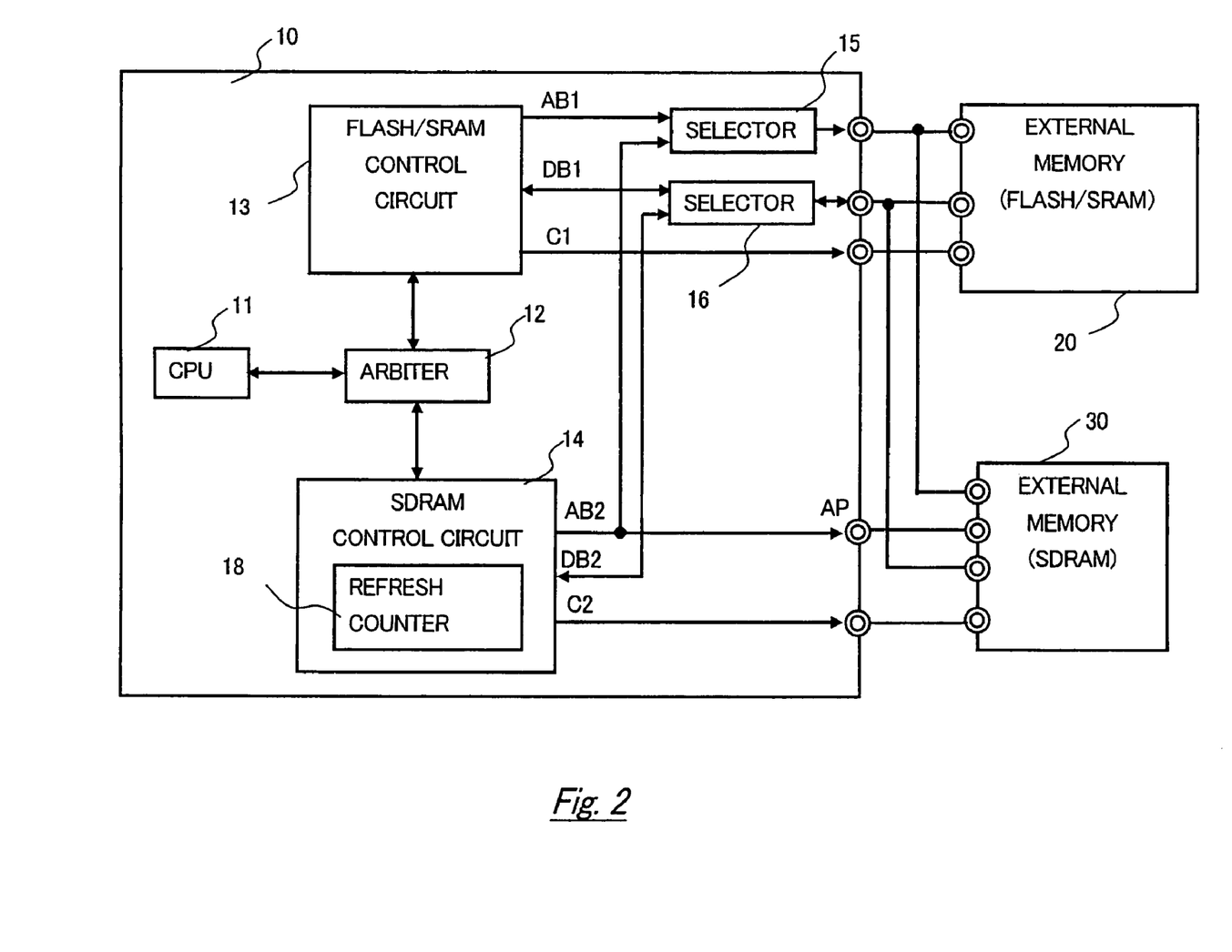
FIG. 2 is a view showing a configuration of a memory control system according to an embodiment of the present invention.

A memory control system according to an embodiment of the present invention is described hereinafter in detail with reference to the drawings. FIG. 1 is a schematic diagram showing a memory control system of this embodiment. The memory control system of this embodiment includes a system LSI 10, an external memory 20 (hereinafter referred to as FLASH/SRAM 20) that may be for example SRAM or flash-memory, and an external memory 30 (hereinafter referred to as SDRAM 30) that is SDRAM. The system LSI 10 is connected to the external memories 20 and 30 by a memory bus that is being shared by the external memories.

As-shown in FIG. 1, the system LSI 10 is comprised of a CPU 11, an arbiter 12, a FLASH/SRAM control circuit 13, a SDRAM control circuit 14, selectors 15, 16, and 17. In the memory control system of this embodiment, the arbiter 12, the FLASH/SRAM control circuit 13, the SDRAM control circuit 14, the selectors 15, 16, and 17 correspond to a memory control circuit.

The CPU 11 operates based on a program stored in a flash memory unit of the external memory 20 or other memory storage. The CPU 11 reads/writes data from/to the FLASH/SRAM 20 and the SDRAM 30. The arbiter 12 is an arbitration circuit that transmits an access request from the CPU 11 if the access request is for the FLASH/SRAM 20. If the access request is for the SDRAM 30, the arbiter 12 transmits the access request to the SDRAM control circuit 14.

The FLASH/SRAM control circuit 13 generates an address signal, a data signal, and a control signal etc for the flash memory or the SRAM in response to an access request from the CPU 11. Then the FLASH/SRAM control circuit 13 outputs the address signal to an address bus AB1, the data signal to a data bus DB1, and the control signal to a control signal line C1.

The SDRAM control circuit 14 generates an address signal, a data signal and a control signal etc for the SDRAM in response to an access request from the CPU 11. Then the SDRAM control circuit 14 outputs the address signal to an address bus AB2, the data signal to a data bus DB2, and the control signal to a control signal line C2. The SDRAM control circuit 14 includes a refresh counter 18 inside. The refresh counter 18 generates a refresh request for the SDRAM 30 by a constant interval (for example every 15 μm) based on a count value of a reference clock, for example.

The address buses AB1 and AB2 from the FLASH/SRAM control circuit 13 and the SDRAM control circuit 14 are connected to the selector 15. The selector 15 selects either one of the address buses to connect to an address output pin. An address signal outputted from the address output pin is input to the FLASH/SRAM 20 or the DRAM 30. The data buses DB1 and DB2 from the FLASH/SRAM control circuit 13 and the SDRAM control circuit 14 are connected to the selector 16. The selector 16 selects either one of the data buses to connect to the FLASH/SRAM 20 or the SDRAM 30. The buses connecting the selectors 15 and 16 with the FLASH/SRAM 20 or the SDRAM 30 are shared as external memory buses.

The address bus AB2 from the SDRAM control circuit 14 is connected to the selector 17. The selector 17 selects a signal line of the address bus AB2 that is comprised of a plurality of signal lines to connect to an address output pin AP. An address signal outputted to the address output pin for precharging AP is input to the SDRAM 30 via a bus different from the common bus. The control signal line C1 from the FLASH/SRAM control circuit 13 is connected to the FLASH/SRAM 20, and the control signal line C2 from the SDRAM control circuit 14 is connected to the SDRAM 30 via different buses.

Prior to explaining an operation of the memory control system of FIG. 1, a connection relationship between a refresh operation of the SDRAM 30 and the memory control system of this embodiment is explained hereinafter. The SDRAM 30 is capable of inputting various commands combining a control signal including /RAS (Row Address Strobe) signal, /CAS (Column Address Strobe) signal, /WE (Write Enable) signal, and /CS (Chip Select) signal, with an input signal to a particular pin etc in the DRAM. The SDRAM 30 performs an operation based on the command if the command is input.

The SDRAM 30 of this embodiment is a SDRAM capable of performing burst access. The burst access is a characteristic access of a SDRAM. In the burst access, there is an access to shorten the time needed to obtain a row address if a word line is selected and the next access is the same word line, by receiving only a column address and a command for read/write. The command to perform above described operation is generated in the SDRAM control circuit 20. In such SDRAM, a data line is not precharged for every read/write operation, but a potential of a data line is based on data corresponding to a selected word line. Accordingly to refresh a SDRAM capable of performing a burst access, all the banks of the SDRAM must be precharged once as shown in FIG. 9. In the SDRAM 30 of this embodiment, all the banks of the SDRAM 30 are precharged by inputting an all banks precharge command at a refresh. The SDRAM 30 of this embodiment is input with a command for precharging all the banks by a control signal and a signal for a particular bit included in an address signal. Further, a self-refresh command that the SDRAM 30 performs a refresh inside is input in combination with a control signal for the SDRAM 30.

Precharging all the banks is performed in case signals of particular bits of the control and address signals are combined in a specified combination. Therefore, if an address signal corresponding to the particular bits are input to the SDRAM, the SDRAM 30 can be refreshed. Generally SDRAMs having various specifications are connected to a system LSI. The selector 17 in this example selects a signal line necessary for inputting a command (all banks precharge) to refresh depending on the specification of the SDRAM to connect to a particular pin of the SDRAM. The selector 17 can be configured as described above by providing a register inside the system LSI 10, for example in the SDRAM control circuit 14, and rewriting its content depending on the specification of the connected SDRAM. The selector 17 will be unnecessary in case the SDRAM 30 connected to the system LSI 10 remains the same.

Figure 3:
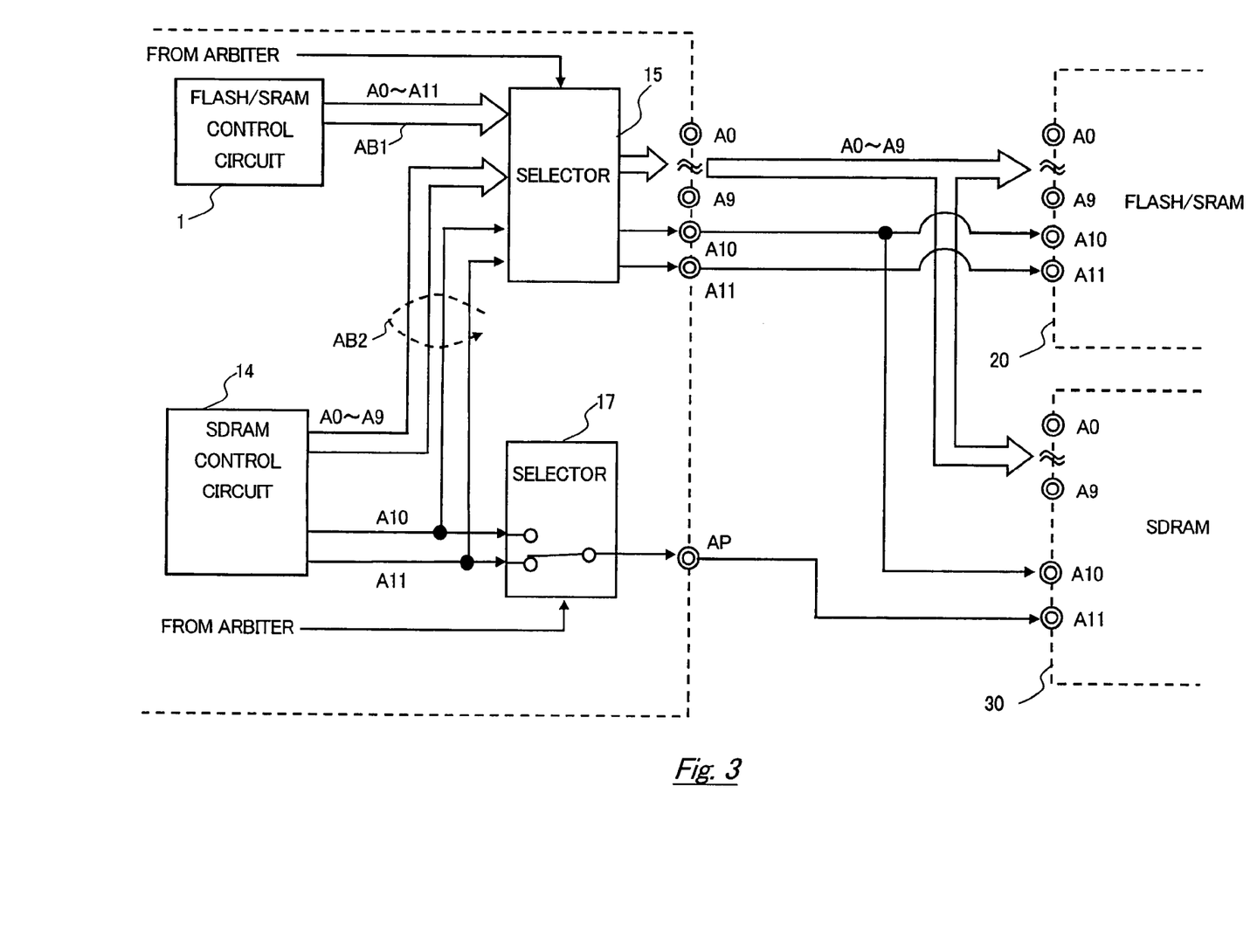
FIG. 3 is a view showing a configuration of a memory control system according to an embodiment of the present invention.
Figure 4:
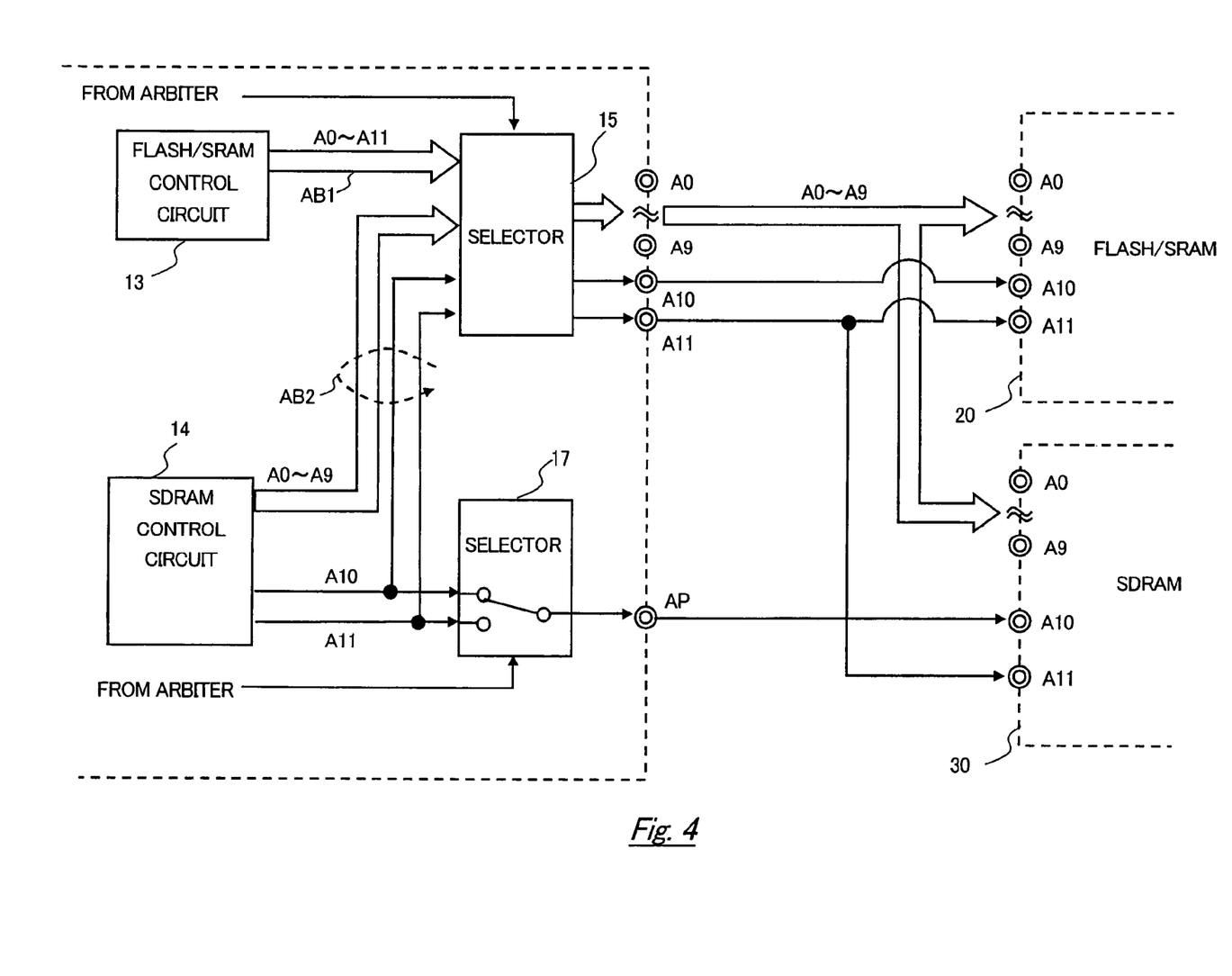
FIG. 4 is a view showing a configuration of a memory control system according to an embodiment of the present invention.

A connection example for inputting the abovementioned all banks precharge command is described hereinafter in detail with reference to a detailed example. FIGS. 3 and 4 are views showing relationships between address pins of the address bus, selectors 15 and 17, the system LSI 10, FLASH/SRAM 20, and the SDRAM 30.

In the memory control system shown in FIGS. 3 and 4, address signals (A0 to A11) are to be input to the FLASH/SRAM 20 and the SDRM 30. Bus and data bus of a control signal are not illustrated in FIGS. 3 and 4.

FIG. 3 is a view showing a case of connecting the SDRAM 30 input with the all banks precharge command in a combination of a control signal and a 12th bit of an address signal (i.e. A11) with the system LSI 10. As shown in FIG. 3, a signal line corresponding to the address signal from 1st to 11th bits of the address bus AB2 of the SDRAM control circuit 14 is connected to a common address bus via the selector 15. The common address bus is connected to a pin for inputting the address signals (A0 to A10) from 1st to 11th bits of the SDRAM 30.

On the other hand, a signal line corresponding to the 12th bit address signal that comprises a part of the all banks precharge command is connected to the address output pin for precharging AP. The address output pin AP for precharging is connected to a pin for inputting the 12th bit address signal of the SDRAm 30 by a bus (hereinafter referred to as a precharge address bus) that is different from the common bus. Specifically, in case an address signal outputting the all banks precharge command to the SDRAM is 12th bit, a setting which indicates 12th bit is stored in the register of the SDRAM control circuit. The selector 17 selects 12th bit address signal based on the setting of the register in the SDRAM control circuit 14. Thereby, 12th bit address signal is always connected to the pin input with the 12th bit address signal of the SDRAM 30 via the precharge address bus.

FIG. 4 is a view showing a case of connecting the SDRAM 30 input with the all banks precharge command in a combination of a control signal and a 11th bit of an address signal (i.e. A10) with the system LSI 10. As with the FIG. 3, a signal line corresponding to the address signal from 1st to 10th bits and 12th bit address signal of the SDRAM control circuit 14 is connected to a common address bus via the selector 15. In the example shown in FIG. 14, the selector 17 connects a signal line corresponding to 11th bit of the address signal is connected to the address output pin for precharging AP and to the SDRAM 30 via the precharge address bus. That is, the setting of the register in the SDRAM control circuit 14 is changed from the example of FIG. 3. In this example, the precharge address bus is connected to a pin input with the 11th address signal of the address signals of the SDRAM 30.

As described in the foregoing, the SDRAM 30 of this embodiment is input with a command PALL for precharging all the banks so as to align voltage levels of all data lines in the SDRAM to a certain voltage level at a refresh operation, and a command SELF for starting a self-refresh operation. Inputting these two commands enables to perform a refresh operation. The signal line selectively connected from the address bus AB2 to the SDRAM is a signal line for inputting these two commands.

An operation of the memory control system structured in the above manner is described hereinafter in detail.

Figure 5A:
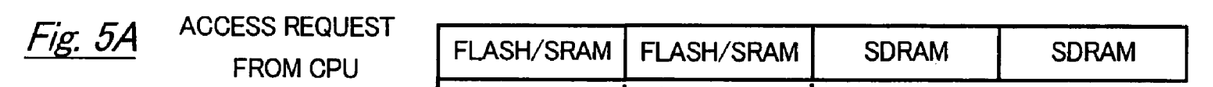
FIGS. 5A to 5C are views showing operations of a memory control system according to an embodiment of the present invention.
Figure 5B:
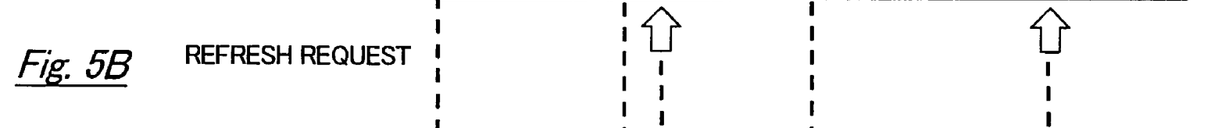
Figure 5C:
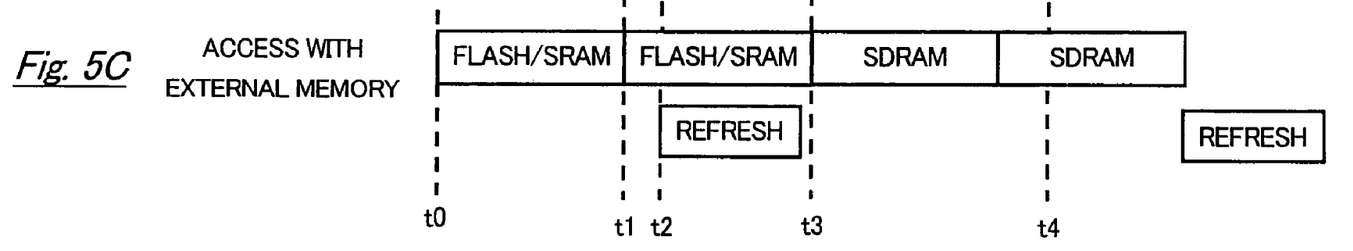

FIGS. 5A to 5C are views schematically showing an access request from the CPU 11 to an external memory, a refresh request generated by the refresh counter 18, and an operation of the memory control system according to this embodiment.

Firstly at a time t0 in FIGS. 5A to 5C, assume that the access request from the CPU 11 is for the external memory 20, and a refresh request is not generated at this time (see FIGS. 5A and 5B). The arbiter 12 outputs data and address obtained from the CPU 11 based on the access request from the CPU 11 to the FLASH/SRAM control circuit 13. The FLASH/SRAM control circuit 13 generates an address signal, a data signal, and a control signal etc according to the access request from the CPU 11. Then the FLASH/SRAM control circuit 13 outputs the address signal to the address bus AB1, the data signal to the data bus DB1, and the control signal to the control signal line C1. The selectors 15 and 16 determine which memory the access request is intended for by referring to for example the arbiter 12, in order to make a selection. In this example the access request is for the FLASH/SRAM 20 at the time t0, therefore the selectors 15 and 16 select the address bus AB1 and the data bus DB1 to connect to the FLASH/SRAM 20. Accordingly an address and a data signals generated in the FLASH/SRAM control circuit 13 are input to the FLASH/SRAM 20, enabling the FLASH/SRAM 20 to successfully establish an access with the CPU 11.

Then at a time t1 in FIGS. 5A to 5C, an access request is generated from the CPU 11 to an external memory. At a time t2, the refresh counter 18 generates a refresh request based on its count value. These operations are described hereinafter in detail. At the time t1, the selectors 15 and 16 selectively connect the AB1 and DB1 to the FLASH/SRAM 20 as with the time t0, so as to establish an access between the CPU 11 and the FLASH/SRAM 20. At the time t2, if a refresh request to the SDRAM 30 is generated while the CPU 11 is accessing the FLASH/SRAM 20 (see FIG. 2B), the SDRAM control apparatus 14 generates a command necessary to refresh the SDRAM 30. Specifically, the SDRAM control apparatus 14 sequentially generates the abovementioned commands PALL and SELF to output the commands the SDRAM 30. As described in the foregoing, the selector 17 selectively connects a signal line corresponding to a particular bit (A11 in FIG. 3 and A10 in FIG. 10) of an address signal for inputting a command to refresh (all banks precharge command) among a plurality of signal lines (A0 to A11) of the address bus AB2, to the SDRAM 30. Therefore a command for a refresh operation combining control signals including /RAS, /CAS, /WE, /CS signals and an input signal to a particular pin (A10 of A11 input pin of SDRAM) is input to the SDRAM 30.

In this embodiment, if a refresh request is generated at t2, for example, the SDRAM control circuit 14 outputs a control signal having a combination of /CS=L, /RAS=L, /CAS=H, and /WE=L to the control signal line C2. The SDRAM control circuit further makes a particular bit of the address signal to be H level. The PALL command is output via the control signal line and the address output pin for precharging. As a result, the PALL command is input to the SDRAM 30, an external memory, via a bus transmitting the control signal and a signal line selected-by the precharge address bus. Then the SDRAM control apparatus 14 sequentially generates a control signal combining /CS=L, /RAS=L, /CAS=L, and /WE=H to correspond to the command SELF. In the command SELF for indicating to start self-refresh, a particular bit of an address signal for inputting a command is not required to be specified because it is not particularly regulated. Responding to the command SELF, the SDRAM starts a self-refresh operation. Inputting the commands PALL and SELF enables the SDRAM 30 to start performing a refresh operation. During the refresh operation based on the refresh request at t2, the selectors 15 and 16 select output buses from the FLASH/SRAM control circuit 13 AB1 and DB1 based on the access request from the CPU 11 to connect to the FLASH/SRAM 20. Accordingly an access between the FLASH/SRAM 20 and the CPU 11 can be successfully carried out.

Then at a time t3 in FIGS. 5A to 5C, assume that the access request from the CPU 11 is for the SDRAM 30, and no refresh request is generated at this time (see FIGS. 5A and 5B). The arbiter 12 outputs data and address obtained from the CPU based on the access request from the CPU 11 to the SDRAM control circuit 13. The SDRAM control circuit 13 generates an address signal, a data signal, and a control signal etc according to the access request from the CPU 11. Then the SDRAM control circuit 13 outputs the address signal to the address bus AB2, the data signal to the data bus DB2, and a control signal to the control signal line C3. The selectors 15 and 16 determine which memory the access request is intended for by referring to for example the arbiter 12, in order to make a selection. In this example the access request is for the SDRAM, therefore the selectors 15 and 16 select the address bus AB2 and the data bus DB2 to connect to the external memory 30. Accordingly an address and a data signals generated in the SDRAM control circuit 13 are input to the external memory 30, enabling the external memory 30 to successfully establish an access with the CPU. At this time in the SDRAM 30, the pin for inputting the above command PALL is connected via the precharge address bus to input/output a signal of the SDRAM in a normal operation.

At a time t4 in FIGS. 5A to 5C, if a refresh request is generated by the refresh counter 18 while the CPU 11 is accessing the SDRAM 30 according to the access request from the CPU 11, the SDRAM control apparatus 14 does not generate a command to refresh described above. This can be achieved by ignoring the refresh request while the arbiter 12 is selecting the SDRAM control circuit 14. This prevents a refresh operation from interrupting when the CPU 11 is accessing to the SDRAM 30. Alternatively, the refresh request while the SDRAM 30 is in access may be retained in the SDRAM control circuit 14 as a flag, for example, so as to start a refresh operation when the arbiter 12 is no longer selecting the SDRAM control circuit. FIGS. 5A to 5C show schematic diagrams showing this situation.

As described thoroughly in the foregoing, according to this embodiment, the SDRAM 30 can be refreshed even while CPU is accessing the external memory 20 such as FLASH/SRAM. Therefore, even in a case an address bus and a data bus are shared by two types of external memories, the buses can be efficiently utilized. Further, the address bus selectively connected to the SDRAM only needs to correspond to a pin for inputting a command to refresh, thereby not requiring another address bus for the SDRAM. The possibility to select an address bus corresponding to the all banks precharge is equal to all the address buses by the selector provided in the system LSI. Thus in case an address bus for inputting the all banks precharge command differs depending on the SDRAM, the command can be input with a setting of the selector.

Examples described in this embodiment are the cases where addresses are specified with 12 bits for the FLASH/SRAM 20 and SDRAM 30. However the number of the bits to specify is not restricted to this but can be any as long as at least a part of address buses are shared. A SDRAM is disclosed in the embodiment, however the present invention can be utilized to a memory which needs a refresh operation such as DRAM.

It is apparent that the present invention is not limited to the above embodiment and it may be modified and changed without departing from the scope and spirit of the invention.

What is claimed is:

1. A memory control system comprising:
   a first memory coupled to a CPU via an address bus and a data bus;
   a SDRAM coupled to a CPU via the address bus and the data bus;
   a SDRAM control circuit for outputting a refresh request to the SDRAM; and
   a selection unit for selecting a signal line of the address bus and outputting a signal of the signal line corresponding to the refresh request of the SDRAM control circuit to the SDRAM.

2. The memory control system according to claim 1, wherein the command corresponding to the refresh request is all bank precharge command of the SDRAM.

3. The memory control system according to claim 1, wherein an address of the SDRAM is determined based on data of the address bus and the signal outputted by the selection unit.

4. A memory control circuit for accessing a first memory and a SDRAM via a bus shared by the first memory and the SDRAM comprising:
   a memory control circuit for generating a control signal for the first memory;
   a SDRAM control circuit for generating a control signal for the SDRAM; and
   a selection unit for selecting a signal line of the bus and outputting a signal of the selected signal line corresponding to a refresh request outputted by the SDRAM control circuit to the SDRAM.

5. The memory control circuit according to claim 4, further comprising: an output terminal for outputting the signal of the selected signal line corresponding to the refresh request to the SDRAM.

6. The memory control circuit according to claim 5, wherein the refresh request includes all banks precharge command to the SDRAM.

7. A memory control system comprising:
- a first memory control circuit for controlling a first memory;
- a SDRAM control circuit for controlling a SDRAM;
- a selection unit for selecting a signal line of an address bus from the SDRAM control circuit corresponding to a refresh request to the SDRAM and connecting to the SDRAM; and
- an address bus for connecting the first memory with the first memory control circuit and connecting the SDRAM with the SDRAM control circuit.

8. The memory control system according to claim 7, wherein the memory control circuit comprises an output terminal for outputting the signal of the selected signal line corresponding to the refresh request to the SDRAM.

9. The memory control circuit according to claim 7, wherein the refresh request includes all banks precharge command to the SDRAM.

10. A memory control system comprising:
- a first memory connected to an integrated circuit via a common address bus;
- a DRAM connected to the integrated circuit via the common address bus; and
- an integrated circuit for outputting a command signal corresponding to a refresh request to the DRAM via a second address bus that is different from the common address bus.

* * * * *